United States Patent
Poplawski

[15] 3,650,568
[45] Mar. 21, 1972

[54] AIR-OVER HYDRAULIC BRAKE SYSTEM

[72] Inventor: Eugene M. Poplawski, Aurora, Ill.
[73] Assignee: Caterpillar Tractor Co., Peoria, Ill.
[22] Filed: Apr. 29, 1970
[21] Appl. No.: 32,812

[52] U.S. Cl. ............................ 303/2, 188/170, 188/358, 303/9, 303/13, 303/40, 303/68
[51] Int. Cl. .......................................................... B60t 13/22
[58] Field of Search ..................... 303/6, 9, 13, 2, 40, 68–69; 188/170, 358, 359

[56] References Cited

UNITED STATES PATENTS

| | | | |
|---|---|---|---|
| 2,270,431 | 1/1942 | Freeman | 303/9 UX |
| 3,285,672 | 11/1966 | Avrea | 303/13 X |
| 2,366,608 | 1/1945 | Freeman | 303/2 X |
| 2,275,255 | 3/1942 | Freeman | 303/13 X |
| 3,503,655 | 3/1970 | Heimler | 303/13 X |

Primary Examiner—Milton Buchler
Assistant Examiner—John J. McLaughlin
Attorney—Fryer, Tjensvold, Feix, Phillips & Lempio

[57] ABSTRACT

A vehicle having pressure actuated service brakes and a pressure releasable emergency brake system is provided with interrelated controls such that the emergency brake is automatically actuated by the service brake controls when a failure occurs in the service brake system.

6 Claims, 2 Drawing Figures

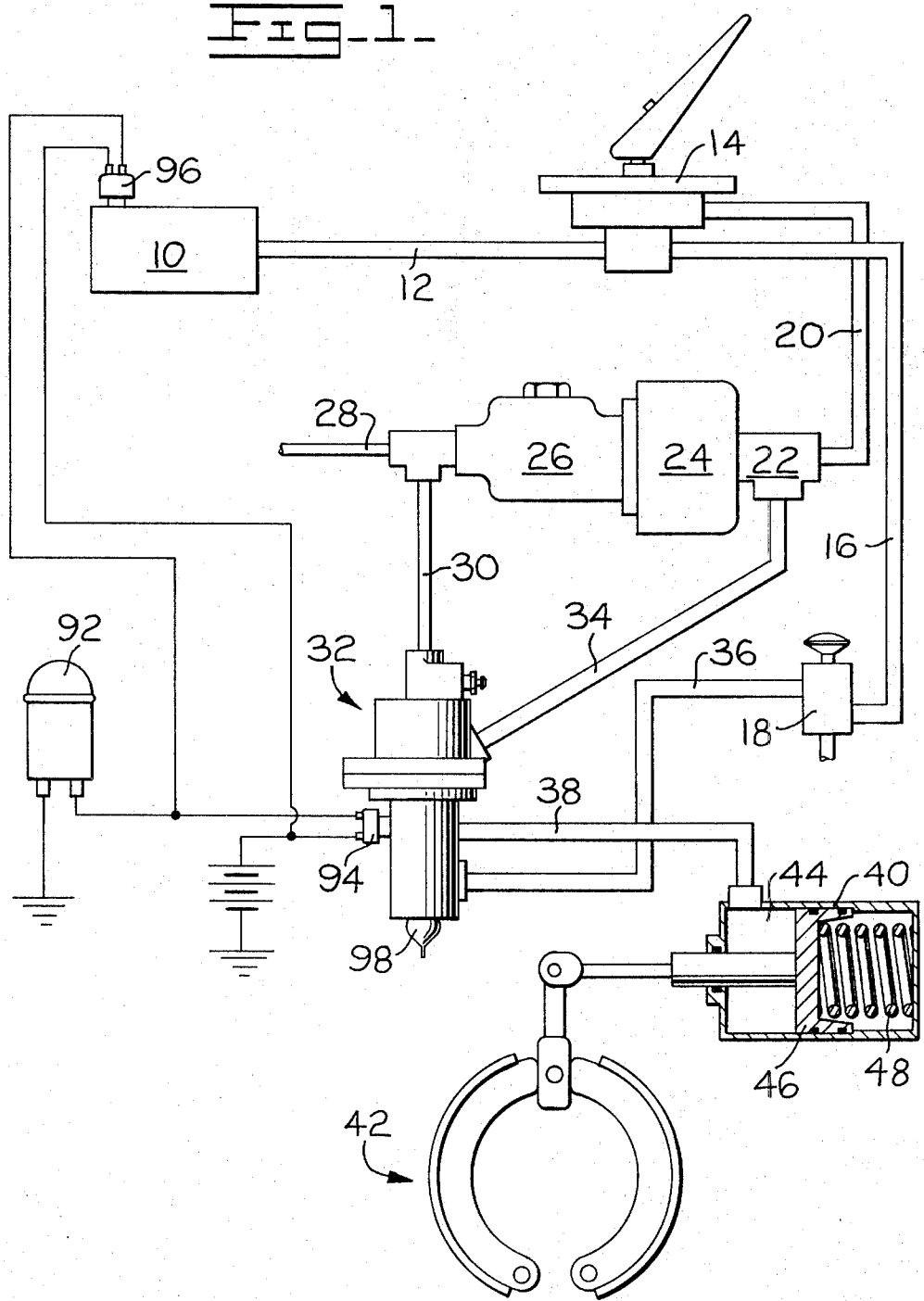

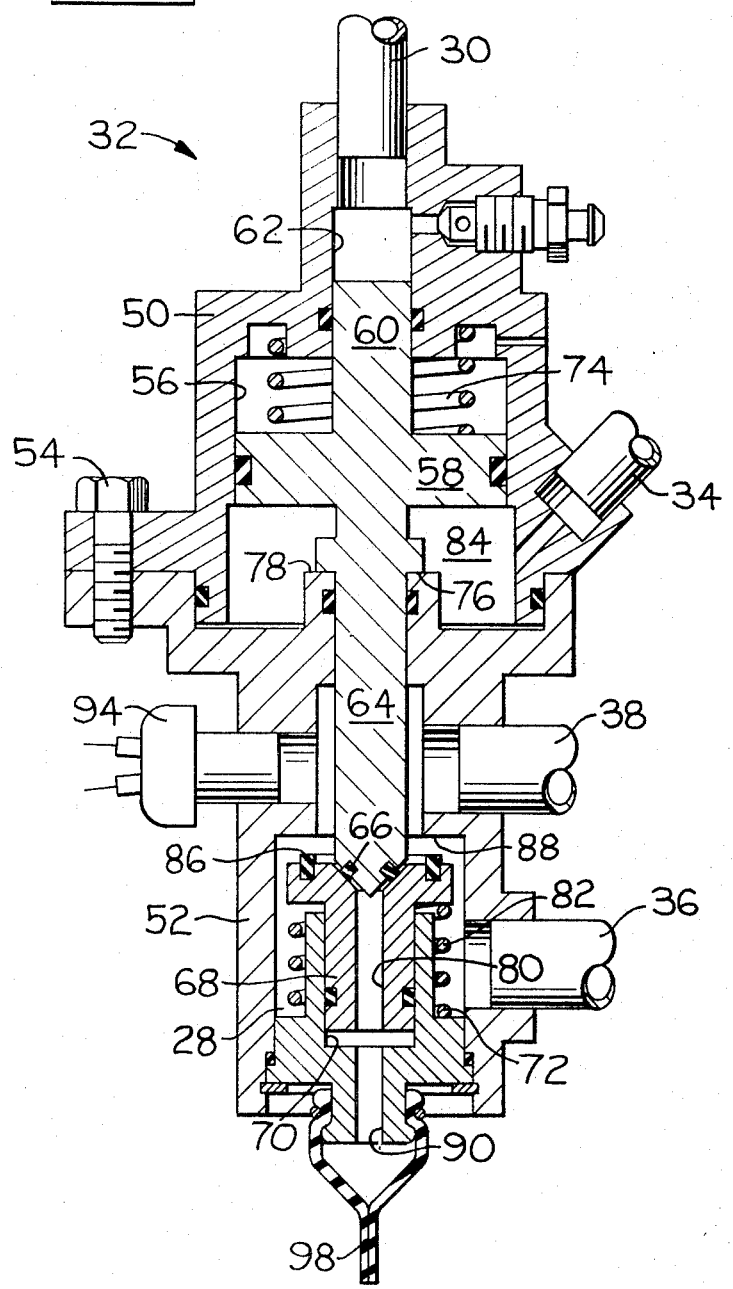

AIR-OVER HYDRAULIC BRAKE SYSTEM

BACKGROUND OF THE INVENTION

The present invention relates to fluid brake systems and pertains more particularly to a system which permits the emergency brake to be applied by the service brake controls when a fluid pressure failure occurs in the service brake system.

Many heavy duty vehicles have a drive line mounted emergency and parking brake system that is separate from the service brakes and adapted to be spring applied and air pressure released. Such systems can be manually actuated by the operator upon discovery of a failure in the service brake system. The main problem with such systems is that the operator normally would not be aware of a failure in the service brake system until he had attempted to apply the brakes and found them to be ineffective. He must then reach for the emergency brake controls and apply them. The delay time between discovery of brake failure and application of the emergency brakes could be dangerous in many instances.

SUMMARY OF THE INVENTION

The primary object of the present invention is to provide a brake system that overcomes the above problems with the prior art systems.

Another object of the present invention is to provide an emergency brake system that is responsive to a failure of the service brake system of the vehicle.

A further object of the present invention is to provide an emergency brake system which can be automatically applied by the service brake controls upon a failure of the service brake system.

In accordance with the present invention, the controls for the service brake system and the emergency brake system of a vehicle are interconnected so that operation of the service brake controls are automatically responsive to apply the emergency brake upon a failure of the service brake system.

BRIEF DESCRIPTION OF THE DRAWINGS

The above and other objects and advantages of the present invention will become apparent from the following description when read in conjunction with the accompanying drawings in which:

FIG. 1 is a schematic view of a brake control system incorporating the present invention;

FIG. 2 is a detailed view in section of a protection valve constructed in accordance with the present invention.

DETAILED DESCRIPTION OF PREFERRED EMBODIMENTS

Referring now to the drawings, and in particular to FIG. 1, there is illustrated a schematic layout of a brake control system constructed in accordance with the present invention. The system generally comprises a source 10 of pressurized fluid such as compressed air which is supplied by means of a conduit 12 to a treadle valve 14 which would normally be the foot pedal in a vehicle. A conduit 16 conveys compressed air to a hand-operated emergency brake actuating valve 18. Actuation of the treadle valve 14 conducts fluid by way of conduit 20 to a T-joint 22 where it is directed to a fluid motor or air cylinder 24 which operates a master cylinder 26 of a conventional hydraulic service brake system (not shown). A conduit 28 conveys hydraulic fluid to the service brakes (not shown), while a second conduit 30 conducts hydraulic fluid to the protection valve 32 whose function will be more clearly described later. Another conduit 34 conducts pressurized air to the control means of the protection valve 32.

A conduit 36 conveys fluid between the valve 18 to one side of valve 32 while a conduit 38 communicates between the other side of the valve and a fluid motor 40 which operates to relieve or disengage a safety brake. The fluid motor 40 is operative upon the introduction of pressurized air into chamber 44 to force piston 46 to the right against spring 48 and thereby release the friction brake 42 which is normally applied to the drive line of a vehicle. Upon loss of pressurized air from chamber 44, the spring 48 overcomes the piston 46, forcing it to the left and applying the emergency brake 42 to lock the drive line of the vehicle.

Referring now to FIG. 2, there is illustrated a detail view of the protection valve 32 which comprises an upper housing 50 and a lower housing 52 held together such as by cap screws 54. The upper housing 50 is formed of a cylindrical bore 56 in which is reciprocally mounted a piston 58 which includes a piston extension 60 extending into a second bore 62. An elongated valve stem 64 extends downward from the piston 58 and extends into seating engagement at 66 with a valve member 68 which is slidably mounted in a bore 70 in the lower chamber 52. A spring 72 engages a lower end of the lower housing and of a valve member 68 urging the valve member upward into tight engagement with the valve stem seat 66. A spring 74 biases against the upper surface of piston 58 forcing it normally downward until shoulder 76 on stem 64 abuts against stop means 78 in housing 50.

Under normal operation, the control valve 18 is open to communicate air through a conduit 36 to the inlet side of the valve 32 which directs the air through the outlet port via conduit 38 to the spring loaded cylinder 40. The air entering the cylinder into chamber 44 urges the piston 46 to the right to release the conventional parking brake 42. The parking or emergency brake 42 may be applied by closing the valve 18 which blocks air from the air source and exhausts the air in the cylinder 40 thereby allowing the spring 48 to force the piston back to the left to apply the brakes 42. The valve 18 is a conventional valve and automatically closes to block the air from the source and exhaust the air in cylinder 40 to the atmosphere when the air pressure drops below a predetermined limit.

When the treadle valve 14 is not depressed, the condition of the valve 32 is as shown in FIG. 2 wherein the piston 58 is forced down by means of spring 74 until shoulder 76 engages stop means 78. The valve seat 66 of member 64 is in sealing contact with a valve member 68 to prevent air flow through the axial passage 80. The valve member 68 is slidably disposed in the bore 70 and is urged into sealing contact with a valve seat 66 by the spring 72. Thus, with control valve 18 in the normally open position, air is directed through conduit 36 into a chamber 82 where it then exits through outlet port or conduit 38 and is directed therethrough to the cylinder 40 to release the parking brake.

Under normal operating conditions, depressing the valve 14 directs pressurized air along conduit 20 to the fluid motor 24 which actuates a master cylinder 26 directing hydraulic fluid under pressure to the wheel brakes in a conventional manner. Simultaneously therewith air is directed through conduit 34 into chamber 84 where it directs an upward force on the piston 58. At the same time, hydraulic fluid directed from the master cylinder 26 is directed along conduit 30 into chamber 62 where it acts on piston 60 exerting a downward force thereon which together with the spring force from spring 74 exerts a downward force greater than the upward force of pressure in chamber 84.

If failure should occur in the hydraulic brake lines, the pressure in chamber 62 would decrease and the upward force on piston 58 from the pressurized fluid in chamber 84 would overcome the force spring 74 thus forcing the piston member 58 upward. As the member 58 moves upward, the spring 72 forces valve member 68 upward whereby sealing area 86 comes into contact with face 88 blocking the flow of air from conduit 36 into conduit 38. Continued upper movement of the piston member 58 unseats the valve seat 66, allowing air trapped in the cylinder 40 to be exhausted to the atmosphere through passageway 80 and exhaust port 90. As pointed out above, exhausting the air from cylinder 40 allows the spring 48 to force the piston 46 to the left to engage the emergency brake 42. Thus upon failure of the hydraulic system of the service brake system, normal depression of the treadle 14 will allow the operator to stop the machine in the normal manner.

Since the emergency brake system will stop the vehicle in the same manner as the service brake system but has substantially less capacity, it is undesirable to continue operation of the vehicle with only the emergency brake system. Therefore in order to alert the operator that he is operating on the emergency brake system, a signal system is provided which comprises a dash mounted ball indicator indicated at 92 which is adapted to turn from green to red according to a signal from a pressure source 94 when the air pressure in chamber 82 drops below a predetermined level. A second switch 96 may be provided at the fluid pressure source 10. In addition to the visual system, an audible warning may be provided such as the sound emitted from an audible protective exhaust port boot 98 provided at the exhaust port 90 from valve 32.

What is claimed is:

1. In a vehicle having a service brake system and a separate emergency brake system, an interconnected control system for said brake systems, said system comprising:
   a source of pressurized air for controlling said system;
   means to direct said pressurized air to said service brake system;
   said service brake system including air and hydraulic circuits;
   means for directing said pressurized air to said emergency brake system for disengaging said emergency brake;
   valve means responsive to a predetermined air pressure to normally disengage said emergency brake; and
   said valve means responsive to a balance of air and hydraulic pressure from said service brake system to maintain said emergency brake in a normally disengaged position, and responsive to a failure of one of said pressures to apply said emergency brake.

2. The system of claim 1 wherein said valve means is responsive to the application of air pressure to said service brake system when hydraulic pressure fails in said system to apply said emergency brake.

3. The system of claim 1 comprising a fluid motor operatively connected to said emergency brake to effect release thereof in response to a predetermined pressure from said source; and,
   said fluid motor including spring means for effecting application of said emergency brake upon failure of said predetermined fluid pressure.

4. A combined service and emergency brake system for a vehicle, said system comprising:
   a service brake system comprising means operated with hydraulic fluid;
   a source of pressurized air for normally controlling said system;
   a fluid responsive motor actuated by fluid from said source to effect the normal energization of said service brake;
   a releasing motor comprising spring means to effect application of said emergency brake and responsive to a predetermined fluid pressure to effect release of said emergency brake;
   valve means for controlling the flow of fluid to and from said releasing motor;
   said valve means comprising a housing;
   a piston reciprocally mounted in a cylindrical chamber in said housing for controlling said valve;
   an elongated valve member extending from said piston into a valve chamber and into engagement with a floating valve seat member reciprocally mounted in said valve chamber;
   an inlet opening, an outlet opening and an exhaust port communicating with said valve chamber;
   said piston means being biased in one direction by said spring means and by hydraulic fluid from the service brake system of said vehicle;
   said valve member being biased in the opposite direction by air pressure; and,
   said valve means being responsive to a loss of pressure in said service brake system to exhaust air pressure from said releasing motor.

5. The system as defined in claim 4 wherein said inlet opening communicates with said source of pressurized air;
   said outlet opening communicates with said releasing motor; and,
   said valve is responsive under normal conditions to permit said air to flow between said inlet and outlet openings.

6. The system as defined in claim 5 wherein said valve is responsive to a decrease of pressure in said hydraulic fluid to block the flow of pressurized air between said inlet and outlet openings and to divert pressurized air from said outlet opening to said exhaust port.

* * * * *